3,015,150
POLYPROPYLENE FISHING ARTICLES
Aldo Fior, Terni, Italy, assignor to Montecatini Societa Generale per l'Industria Mineraria e Chimica, Milan, Italy
No Drawing. Filed Jan. 28, 1958, Ser. No. 711,564
Claims priority, application Italy Feb. 4, 1957
4 Claims. (Cl. 28—81)

This invention relates to articles for use in connection with fishing, such as lines, guide yarns and nets. More particularly, the invention relates to such articles made of yarns formed from at least prevailingly isotactic high polymers of propylene.

Articles of the type with which the invention is concerned are subjected to strong stresses in use and it is important, therefore, that the nets, lines and so forth be formed of fibers having a high work of rupture (toughness) which is defined as the work the fiber is able to absorb before it breaks. In addition to toughness and resistance to chemical and mechanical stresses, the lines, nets, and like fishing accessories should possess high mechanical strength and elasticity, resistance to marine organisms, and flexibility.

The fishing articles made of available natural and artificial fibers do not possess these properties in sufficient degree, nor are the defects of those articles remedied by treating the fibers, yarns or articles with various coating and impregnating materials.

The lines, nets and so on which are made from the available synthetic fibers show some improvement over those made of natural or artificial fibers, but even those articles are deficient in various important respects and particularly in the wear strength, the value for the work of rupture (toughness) being relatively low for the synthetic fibers which have been available in the art.

An object of this invention is to provide new fibrous fishing articles or accessories which do not have the drawbacks or disadvantages of the fishing articles available heretofore.

Another object is to provide fibrous fishing articles, such as nets, lines or the like, which have a work of rupture (toughness) higher than that of fishing articles made from synthetic fibers available in the art.

These and other objects are accomplished by the present invention which provides fishing lines, nets, and so forth made from yarns (continuous filament or staple) formed from fibers of at least prevailingly isotactic polypropylene.

As has been disclosed by G. Natta and his coinventors, e.g., in the Natta et al. Communication to the Editor published in Jr. Amer. Chem. Soc. March 20, 1955, propylene can be polymerized to new linear regular head-to-tail high polymers made up of macromolecules having different steric structures which Natta has identified as "isotactic" and "atactic," respectively, and which macromolecules, if desired, can be separated on the basis of their different steric structures by means of selective solvents. Natta et al. have also shown that the polymerization of propylene can be oriented, by use of certain selected catalysts, to the production of polypropylene made up prevailingly of isotactic macromolecules.

The term "isotactic" is not synonymous with "crystalline." Rather, "isotactic" was originated by Natta to identify the particular steric structure in a macromolecule of an alpha-olefin ($CH_2=CHR$) polymer characterized in that, assuming the macromolecule fully extended in a plane, the R groups bound to the tertiary asymmetric carbon atoms of adjacent monomer units making up a given section of the main chain are on one side of the plane containing the main chain of the polymer, and the hydrogen atoms attached to those carbon atoms are on the opposite side of said plane.

The isotactic molecular structure, discovered by Natta et al., exists in their polypropylene independently of whether the polymer is in the amorphous or in the crystalline state. The polypropylene possesses the isotactic structure independently of the fact that the polymer may be, under suitable conditions, in a crystalline, or in a non-crystalline state.

The yarns used in constructing the fishing articles of this invention are formed from fibers of at least prevailingly (over 60%) isotactic polypropylene and which are characterized by an exceptionally high work of rupture or toughness.

The work of rupture (toughness) of fibers and yarns is calculated from the stress-elongation curve (the area comprised between said curve and the abscissa) or, approximately, as half of the product of the tenacity times the elongation at break. In order for the fishing articles to meet the demands imposed on them in use, it is essential that only a low proportion of this work is wasted as thermal energy and that most of it is stored as elastic energy which can be recovered.

The ratio $$X = \frac{Lr}{Ld} \cdot 100$$

where $Lr$ is the elastically recovered work and $Ld$ is the deformation work, is a characteristic of the value of the fiber for the present purposes.

In Table I below, we give the results obtained by determining the value of X at 20% and 10% elongation for yarns of the polypropylene in comparison with the value at those elongations for polyamide (nylon) yarns and polyester ("Dacron") yarns, the yarns being otherwise identical and treated in the same way.

Table I

| | Polypropylene | Polyamide | Polyester |
|---|---|---|---|
| Specific work of rupture | 0.91 | 0.82 | 0.45 |
| X for 20% elongation, percent | 53 | 38 | 25 |
| X for 10% elongation, percent | 80 | 78 | 35 |

Another requirement for the fishing articles is that they must be capable of withstanding repeated stresses. That is, it must be possible to subject the articles to frequent, intense stresses without deformation thereof or progressive hardening of the fibers resulting in a decrease in the elongation at break and embrittlement. The fishing articles of the present invention meet these requirements fully, as is shown in Table II, which gives the results obtained by subjecting yarns of the polypropylene to repeated frequent (50 cycles/minute) stresses, and compares those results with the results obtained when the polyamide and polyester yarns were subjected to the same test.

Table II

POLYPROPYLENE

| | Initial Properties | Properties after 100 cycles between— | | After 100 cycles between 0 and 2.5 g./den. |
|---|---|---|---|---|
| | | 0 and 2.5 g./den. | 0 and 5 g./den. | |
| Residual strain | | +0.6% | +2% | +2%. |
| Elongation | 28% | 27% | 25% | 25%. |
| Tenacity | 6.5 g./den. | 6.5 g./den. | 6.6 g./den. | 6.8 g./den. |

POLYAMIDE 6.6

| Residual strain | | +1.4% | the yarns break during the tests at 67 cycles. | +3.2% |
| Elongation | 30% | 25% | | 23%. |
| Tenacity | 5.5 g./den. | 5.6 g./den. | | 5.5 g./den. |

POLYESTER

| Residual strain | | +3% | the yarns break during the tests at 41 cycles. | +9%. |
| Elongation | 16% | 13% | | 11%. |
| Tenacity | 5.2 g./den. | 5.5 g./den. | | 5.7 g./den. |

The superior elasticity of the polypropylene yarn is apparent from the values of instantaneous and delayed elastic recovery for different values of initial elongation shown in Table III.

Table III

| | Polypropylene | | Polyamide | | Polyester | |
|---|---|---|---|---|---|---|
| | Initial elong. | | Initial elong. | | Initial elong. | |
| | 5% | 20% | 5% | 20% | 5% | 20% |
| Instantaneous elastic recovery, percent | 50 | 34 | 22 | 9 | 13 | 6 |
| Delayed elastic recovery, percent | 50 | 51 | 78 | 73 | 78 | 42 |
| Permanent elongation, percent | 0 | 15 | 0 | 18 | 9 | 52 |

It will be evident from a consideration of the comparative values given in Table III that, even when the permanent strain is the same for the three different yarns, the proportion of instantaneous elastic recovery, which is a highly desirable property in fishing articles, is much higher for the polypropylene yarns than for the other types of synthetic yarns.

Other characteristics of the present fishing articles, particularly the wear resistance, and proofness against attack by marine organisms and sea water, are such that the articles are not altered in use, do not swell or become rigid, and do not rot even when they are immersed in water continuously for long periods of time or when they are allowed to remain in moist rooms. Moreover, the mechanical characteristics of the articles made from the polypropylene yarns are substantially identical in both dry and moist atmospheres. This is in contrast to the articles made from other types of yarns the mechanical characteristics, appearance and size of which are considerably influenced by the moisture content of the surrounding atmosphere.

The fishing articles made from the polypropylene yarns do not absorb water or increase in weight as a result of such absorption, and fishing nets according to the invention do not require a long exposure to air in order to dry, after wetting thereof.

The fishing articles can be made from yarns obtained, e.g., by extruding molten polypropylene into a cooling medium or by extruding a solution of the polypropylene into a coagulating medium, quenching the filaments in water at 10° C., stretching the filaments with a ratio of 1:3 to 1:10, and heat-stabilizing the filaments and yarns at a temperature of 125° C. to 145° C. After orientation by stretching, the yarns may have a tenacity of 6.5–7.5 g./den.

Fishing lines or guide yarns of the invention may have conically tapered ends which may be obtained by varying the speed at which the filament is stripped from the spinneret. Suitable means, such as an elliptical transmission gear connected with a pair of grasping rollers, an eccentric roll, or a roll of irregular shape may be associated with the spinning apparatus for insuring that the ends of the yarns are conically tapered.

The present fishing lines have less tendency to become tangled than do the conventional lines. Because of the low density of the polypropylene yarns, light-weight fishlines which tend to float on the surface of the water at the end of the cast and during reeling in or until the bait is seized by the fish are provided. So-called floating or buoyant fishlines can be obtained.

Fishing nets according to the invention are obtained by hand or machine knotting the polypropylene yarns produced as described above. Such nets are free from the "slip mesh" characteristics of various prior art fishing nets and do not require treatments with extraneous synthetic resins for stabilizing the size of the mesh.

Treatment of the lines and nets of the invention with extraneous water-repelling or other surface modifying agents is not required since the articles are inherently water-repellent. However, it is within the scope of the invention to apply such treatments to the yarns or final articles, and also to include with the polypropylene appropriate amounts of various dyeing pigments and inert fillers. None of those treatments has a damaging effect on the physical and mechanical properties of the fishing articles.

The fishing articles are preferably made of yarns formed entirely from fibers of the at least prevailingly isotactic polypropylene, and which may be staple, mono-filament or continuous multi-filament yarns. However, if desired, the yarns may be formed from mixtures of the polypropylene fibers or filaments with natural fibers, artificial fibers or filaments, or other synthetic fibers or filaments. Natural fibers such as cotton, artificial fibers such as regenerated cellulose fibers, and synthetic fibers of the type of nylon, "Dacron" and vinyl and vinylidene resins, and polyethylene may be mixed with the polypropylene fibers in amounts between 5 and 50% and the resulting yarns may then be used in constructing the fishing nets, fishlines, etc.

Since some changes and variations may be made without departing from the spirit of the invention, it is intended to include in the scope of the appended claims all such modifications as may be apparent to those skilled in this art.

What is claimed is:

1. Fibrous fishing articles made of yarns of fiber-forming polypropylene consisting essentially of isotactic crystalline macromolecules and linear, regular head-to-tail atactic macromolecules, the isotactic macromolecules constituting at least 60% of the polypropylene, said yarns forming the fishing articles being stretched and oriented heat-stabilized yarns having a tenacity of 6.5 g./den. to 7.5 g./den., a ratio of elastically recovered work to deformation work of about 80% at an elongation of 10% and of about 53% at an elongation of 20% and calculated by the formula $$X = \frac{Lr}{Ld} \cdot 100$$

in which $Lr$ is the elastically recovered work and $Ld$ is the deformation work; a residual strain of from 0.6% up to 2.0% after being subjected to repeated stresses of from 0 to 5.0 g./den. at 50 cycles/minute; an instantaneous elastic recovery of about 50% when the initial elongation is 5% and of about 34% when the initial elongation is 20%; a delayed elastic recovery of about 50% when the initial elongation is 5% and of about 51% when the initial elongation is 20%; and a permanent elongation of about zero when the initial elongation is 5% and of about 15% when the initial elongation is 20%; the mechanical characteristics of the fishing articles being commensurate with those of the polypropylene yarns and being essentially the same when the fishing article is exposed to moisture in use as when the fishing article is stored in dry atmosphere.

2. A fishing net consisting of polypropylene yarns as defined in claim 1, said fishing net being further characterized in being essentially free of "slip mesh" characteristics.

3. A fishing line made of polypropylene yarn as defined in claim 1.

4. A fishing guide yarn consisting of polypropylene yarn as defined in claim 1.

References Cited in the file of this patent

UNITED STATES PATENTS

| | | |
|---|---|---|
| 2,325,060 | Ingersoll | July 27, 1943 |
| 2,367,173 | Martin | Jan. 9, 1945 |
| 2,882,263 | Natta | Apr. 14, 1959 |

FOREIGN PATENTS

| | | |
|---|---|---|
| 538,782 | Belgium | Dec. 6, 1955 |